(12) United States Patent
Zhang et al.

(10) Patent No.: US 10,963,880 B2
(45) Date of Patent: *Mar. 30, 2021

(54) SYSTEM AND METHOD FOR REALIZING IDENTITY IDENTIFICATION ON THE BASIS OF RADIO FREQUENCY IDENTIFICATION TECHNOLOGY

(71) Applicant: ADVANCED NEW TECHNOLOGIES CO., LTD., Grand Cayman (KY)

(72) Inventors: Hong Zhang, Hangzhou (CN); Huanmi Yin, Hangzhou (CN); Feng Lin, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/802,157

(22) Filed: Feb. 26, 2020

(65) Prior Publication Data

US 2020/0193446 A1 Jun. 18, 2020

Related U.S. Application Data

(63) Continuation of application No. PCT/CN2018/105923, filed on Sep. 17, 2018.

(30) Foreign Application Priority Data

Nov. 10, 2017 (CN) .......................... 201711105170.6

(51) Int. Cl.
*G06Q 20/40* (2012.01)
*G06K 7/10* (2006.01)
(Continued)

(52) U.S. Cl.
CPC ... *G06Q 20/40145* (2013.01); *G06K 7/10366* (2013.01); *G06K 9/00288* (2013.01);
(Continued)

(58) Field of Classification Search
CPC ............. G06Q 20/40145; G06Q 20/14; G06Q 20/204; G06Q 40/00; G06K 7/10366; G06K 9/00288; G07F 17/145
See application file for complete search history.

(56) References Cited

U.S. PATENT DOCUMENTS

| 7,142,121 | B2 | 11/2006 | Chan et al. |
| 7,213,766 | B2 | 5/2007 | Ryan et al. |

(Continued)

FOREIGN PATENT DOCUMENTS

| CN | 101140613 A | 3/2008 |
| CN | 101493899 A | 7/2009 |

(Continued)

OTHER PUBLICATIONS

LA by Metro, "How to TAP: Using TAP Cards 101", The MetroDuo Blog—Adventures on Metro Rail, Oct. 9, 2012. (Year: 2012).*

(Continued)

*Primary Examiner* — Kito R Robinson
*Assistant Examiner* — Abdulmajeed Aziz

(57) ABSTRACT

The specification discloses a system and a method for realizing identity identification based on a radio frequency identification technology. The system comprises: a radio frequency detector on the ground and configured to detect radio frequency tags and send, when a radio frequency tag is detected, information carried in the radio frequency tag to a controller; a camera configured to collect a face image and send the collected face image to the controller; and the controller, configured to: determine, according to the information, a first identification of a user corresponding to the
(Continued)

radio frequency tag, determine, according to the face image, a second identification of the user, and control a turnstile to allow the user to pass through when the first identification of the user and the second identification of the user match.

6 Claims, 2 Drawing Sheets

(51) Int. Cl.
| | |
|---|---|
| *G06K 9/00* | (2006.01) |
| *G06Q 20/14* | (2012.01) |
| *G07F 17/14* | (2006.01) |
| *G06Q 40/00* | (2012.01) |
| *G06Q 20/20* | (2012.01) |

(52) U.S. Cl.
CPC ........... *G06Q 20/14* (2013.01); *G07F 17/145* (2013.01); *G06Q 20/204* (2013.01); *G06Q 40/00* (2013.01)

(56) References Cited

U.S. PATENT DOCUMENTS

| | | | |
|---|---|---|---|
| 7,628,322 B2 | 12/2009 | Holtmanns et al. | |
| 7,731,086 B2 | 6/2010 | Saunders et al. | |
| 8,040,245 B2* | 10/2011 | Koblasz | G08B 21/245 340/573.1 |
| 8,325,011 B2 | 12/2012 | Butler et al. | |
| 8,400,296 B2 | 3/2013 | Brinton et al. | |
| 8,610,597 B2 | 12/2013 | Stefik et al. | |
| 8,674,805 B2* | 3/2014 | Charych | G07C 9/10 340/5.7 |
| 8,749,380 B2 | 6/2014 | Vock et al. | |
| 8,786,407 B2 | 7/2014 | Liu et al. | |
| 8,947,233 B2 | 2/2015 | Butler et al. | |
| 9,312,598 B1* | 4/2016 | Callas | H01Q 21/28 |
| 9,749,823 B2 | 8/2017 | Rowe et al. | |
| 9,762,715 B2 | 9/2017 | Saarisalo | |
| 9,842,330 B1* | 12/2017 | Van Os | G06Q 20/3274 |
| 9,842,346 B2 | 12/2017 | Fiorucci et al. | |
| 2002/0161729 A1* | 10/2002 | Andrews | G07F 7/0866 705/417 |
| 2006/0278704 A1* | 12/2006 | Saunders | G07B 15/04 235/382 |
| 2006/0292984 A1 | 12/2006 | Teate et al. | |
| 2007/0252001 A1* | 11/2007 | Kail | G07C 9/33 235/380 |
| 2009/0210299 A1* | 8/2009 | Cowen | G06Q 20/405 705/13 |
| 2012/0278137 A1* | 11/2012 | Dixon | G06Q 20/4016 705/13 |
| 2013/0021139 A1 | 1/2013 | Guo | |
| 2015/0221151 A1* | 8/2015 | Bacco | G06K 9/00288 340/5.83 |
| 2016/0042631 A1* | 2/2016 | Ho | G01C 9/00 340/5.32 |
| 2016/0078264 A1 | 3/2016 | Armstrong et al. | |
| 2016/0092834 A1 | 3/2016 | McCulloch et al. | |
| 2016/0163122 A1* | 6/2016 | Mandelkow | G06Q 20/3255 705/13 |
| 2016/0371893 A1* | 12/2016 | Busch-Sorensen | G06Q 20/3278 |
| 2016/0379141 A1* | 12/2016 | Judge | G07B 15/02 705/5 |
| 2017/0329777 A1* | 11/2017 | Vlugt | G07C 9/257 |

FOREIGN PATENT DOCUMENTS

| | | |
|---|---|---|
| CN | 102184377 A | 9/2011 |
| CN | 202535538 U | 11/2012 |
| CN | 103150531 A | 6/2013 |
| CN | 105023106 A | 11/2015 |
| CN | 205788369 U | 12/2016 |
| CN | 106778189 A | 5/2017 |
| CN | 203759780 U | 8/2017 |
| CN | 107256483 A | 10/2017 |
| CN | 107862226 A | 3/2018 |
| TW | M329358 U | 4/2008 |

OTHER PUBLICATIONS

WMATA, "Approved Fiscal Year 2011 Annual Budget", Sep. 24, 2010. (Year: 2010).*
First Search Report for Taiwanese Application No. 107131692, dated May 17, 2019, 1 page.
First Search Report for Chinese Application No. 201711105170.6, dated Jul. 25, 2019, 1 page.
International Search Report and Written Opinion of the International Searching Authority for International Application No. PCT/CN2018/105923, dated Dec. 3, 2018, with partial machine English translation, 10 pages.
International Preliminary Report on Patentability Chapter I for PCT Application No. PCT/CN2018/105923 dated May 22, 2020.
Search Report for European Application No. 18876400.5, dated Sep. 14, 2020, 9 pages.

* cited by examiner

SYSTEM AND METHOD FOR REALIZING IDENTITY IDENTIFICATION ON THE BASIS OF RADIO FREQUENCY IDENTIFICATION TECHNOLOGY

CROSS REFERENCE TO RELATED APPLICATION

The present application is a continuation application of International Patent Application No. PCT/CN2018/105923, filed on Sep. 17, 2018, which claims priority to Chinese Patent Application No. 201711105170.6, filed on Nov. 10, 2017. The entire content of the above referenced applications is incorporated herein by reference.

TECHNICAL FIELD

The present specification relates to the field of Internet technologies, and in particular, to a system and a method for realizing identity identification based on a radio frequency identification technology.

BACKGROUND

Along with the development of technologies, various identification technologies have been extensively applied in daily life. Taking a subway turnstile as an example, a user may pass through the turnstile and make payments by swiping a card. Taking offline electronic payments as an example, a user may use a cell phone to display a payment barcode to make payments. However, existing identification technologies still require users to present a card, a cell phone, or other articles, making it inconvenient. Moreover, if a user forgets to carry the relevant article, the above functions will not be accomplished.

SUMMARY

In view of the above, the present specification provides a system and a method for realizing identity identification based on a radio frequency identification technology.

For example, the present specification is implemented through the following technical solutions.

A system for realizing identity identification based on a radio frequency identification technology comprises: a radio frequency detector configured to detect radio frequency tags and send, when a radio frequency tag is detected, information carried in the radio frequency tag to a controller; a camera configured to collect a face image and send the collected face image to the controller; and the controller, configured to: determine, according to the information, a first identification of a user corresponding to the radio frequency tag, determine, according to the face image, a second identification of the user, and control a turnstile to allow the user to pass through when the first identification of the user and the second identification of the user match.

Another system for realizing identity identification based on a radio frequency identification technology comprises: a radio frequency detection module configured to detect radio frequency tags and send, when a radio frequency tag is detected, information carried in the radio frequency tag to a control module; an image collecting module configured to collect a face image and send the collected face image to the control module; the control module configured to: determine, according to the information, a first identification of a user corresponding to the radio frequency tag, determine, according to the face image, a second identification of the user, and send an execution signal to an execution module when the first identification of the user and the second identification of the user match; and the execution module configured to control a turnstile to allow the user to pass through upon reception of the execution signal from the control module.

A method for realizing identity identification based on a radio frequency identification technology comprises: detecting radio frequency tags; determining, when a radio frequency tag is detected, a first identification of a user corresponding to the radio frequency tag according to information carried in the radio frequency tag; obtaining a face image of the user; determining a second identification of the user based on the obtained face image of the user; and executing a predetermined operation to control a turnstile to allow the user to pass through if the first identification of the user and the second identification of the user match.

From the above description, it may be seen that the present specification may provide a radio frequency detecting module (e.g., on the ground) to detect radio frequency tags carried in objects such as a user's shoes, and may identify the user according to information carried in the radio frequency tag. The user is not required to present a card, a cell phone, or other articles throughout the entire process. The implementation is convenient, fast, and secure, and the user experience is excellent.

DETAILED DESCRIPTION OF THE INVENTION

Exemplary embodiments will be described in detail below, and the examples of the embodiments are illustrated in the accompanying drawings. When the description below involves the accompanying drawings, identical numbers in different drawings represent identical or similar elements, unless otherwise indicated. The implementations described in the following exemplary embodiments do not represent all implementations that are consistent with the present specification. Conversely, they are only examples of devices and methods that are consistent with some embodiments of the present specification as set forth in detail in the appended claims.

Terms used in the present specification are only for the purpose of describing particular embodiments, rather than limiting the present application. "A," "the," and "said" in the singular form used in the present specification and the appended claims are intended to include the plural form as well, unless clearly indicated in the context to have other meanings. It should also be understood that the term "and/or" used in the present specification refers to and includes any or all possible combinations of one or more associated listed items.

Terms such as first, second, third, and the like may be used in the present specification to describe various information, but the information shall not be limited to these terms. These terms are only used to differentiate information of the same type from each other. For example, without departing from the scope of the present specification, first information may also be referred to as second information, and similarly, second information may also be referred to as first information. Depending on the context, the term "if" used here may be construed as "when . . . " or "at the time of . . . " or "in response to determination."

The present specification provides a solution for identity identification based on a radio frequency identification technology, which may be implemented through cooperation between an identification system and radio frequency tags.

Here, the radio frequency tags may be associated with a shoe of a user, for example, attached to the shoe bottom, hung to the shoe side, and the like. The user may bind his/her identity information with the radio frequency tag in advance to facilitate the subsequent implementation of identity identification. The radio frequency tags may also be attached to other clothing objects of the user, for example, at the trim of a trouser, which is not particularly limited in the present specification.

Figure 1:
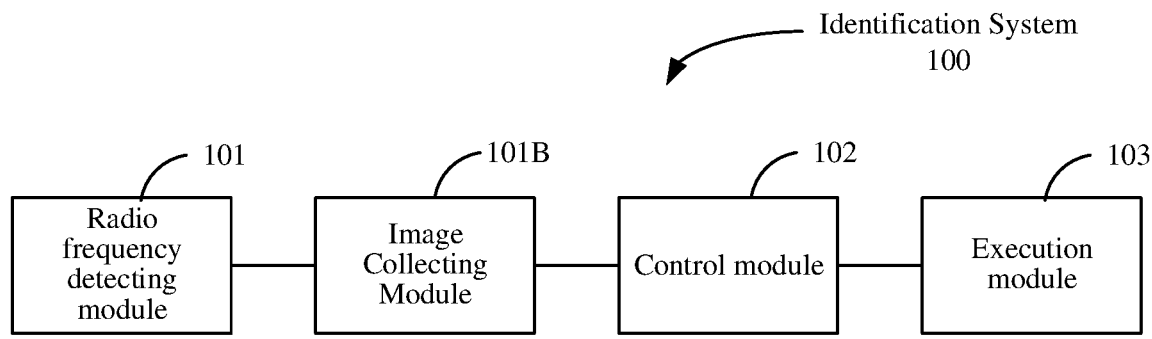
FIG. 1 is a schematic structural diagram of an identification system illustrated in an exemplary embodiment of the present specification.

Referring to FIG. 1, the identification system 100 may comprise a radio frequency detecting module 101, a control module 102 and an execution module 103. Here, the radio frequency detecting module 101 may be attached to (e.g., installed on, placed on) the ground and configured to detect radio frequency tags.

In some embodiments, the radio frequency detecting module 101 and radio frequency tags may adopt the NFC (Near Field Communication) technology for data transmission, or may adopt the ultrahigh frequency RFID (Radio Frequency Identification) technology for data transmission, which is not particularly limited in the present specification.

Figure 2:
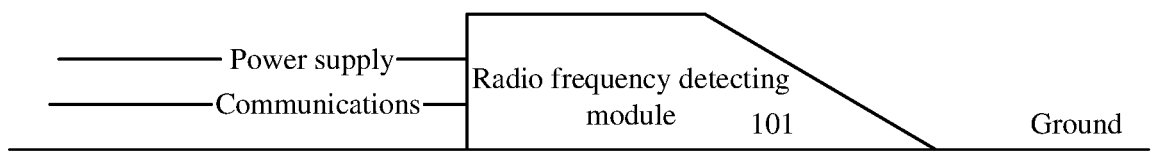
FIG. 2 is a schematic diagram of a radio frequency detecting module illustrated in an exemplary embodiment of the present specification.

Referring to FIG. 2, FIG. 2 shows a schematic diagram of the radio frequency detecting module 101. The radio frequency detecting module 101 may comprise a power supply input for inputting a power supply. The radio frequency detecting module 101 may further comprise a communication interface, which may be a wired communication interface, such as a serial port, a USB port, a network port, and the like. In alternative embodiments, the communication interface may be a wireless communication interface, such as Bluetooth, GPRS (General Packet Radio Service), Wi-Fi (Wireless-Fidelity), 3G (the 3rd Generation mobile communication technology), 4G (the 4th Generation mobile communication technology), and the like, which is not particularly limited in the present specification.

In one example, the radio frequency detecting module 101 may be placed on the ground in the form of a floor mat to be flat on the ground. In another example, the radio frequency detecting module 101 may also be exposed on the ground, such as 5 cm above the ground. In such an implementation, referring to FIG. 2 again, an inclined slope is provided on the user side of the radio frequency detecting module 101 to prevent users from bumping into the module.

After detecting a radio frequency tag, the radio frequency detecting module 101 may obtain information carried in the radio frequency tag, such as user account information and the like. Subsequently, the obtained information may be sent to the control module 102 via the above communication interface.

For example, when the user puts on shoes attached with a radio frequency tag and steps on the radio frequency detecting module 101 placed on the ground, the radio frequency detecting module 101 may obtain information carried in the radio frequency tag, and then send the information to the control module 102, so that the control module 102 identifies the identity of the user.

The control module 102 may be a CPU, an FPGA (Field Programmable Gate Array), an MCU (Microcontroller Unit), and the like, which is not particularly limited in the present specification.

Upon receiving the above-described information sent from the radio frequency detecting module 101, the control module 102 may identify, according to the information, a user corresponding to the radio frequency tag. For example, a local database may be searched according to the information to determine the user corresponding to the radio frequency tag. As another example, the information may also be sent to a server, and the server searches for the user corresponding to the information and then returns a search result to the control module 102. After determining that a user corresponding to the information, i.e., a user corresponding to the radio frequency tag, has been identified, the control module 102 may send an execution signal to the execution module 103.

Upon receiving the execution signal from the control module, the execution module 103 may execute a predetermined operation. The predetermined operation may be related to an application scenario in which the identification system 100 is located. In one example, when the identification system 100 is applied to a turnstile system, the predetermined operation may be controlling a blocker of the turnstile to open to allow a user to pass through. In another example, when the identification system 100 is applied to a POS system, the predetermined operation may comprise: obtaining a bill of a user. For example, a cash register page is output via a visual interface to a cashier, so that the cashier inputs an amount of consumption by the user. In still another example, an infrared identification device may also be turned on to scan products selected by a user and to calculate the price.

In an exemplary application, the identification system 100 may also be applied to other application scenarios, which is not particularly limited in the present specification.

From the above description, it may be seen that the present specification may provide a radio frequency detecting module on the ground to detect radio frequency tags carried in objects such as a user's shoes, and may identify the user according to information carried in the radio frequency tag. The user is not required to present a card, a cell phone, or other articles throughout the entire process. The implementation is convenient, fast, and secure, and the user experience is improved.

In some embodiments, for a scenario with a higher security level, the identification of radio frequency tags may also be combined with other identification manners to improve the security. For example, the identification of radio frequency tags may be combined with face image recognition. In such implementation, the identification system 100 may further comprise an image collecting module 101B configured to collect a face image and send the collected face image to the control module 102.

According to the face image, the control module 102 may identify a corresponding user based on a local database, or may send the face image to a server, so that the server assists the identification. When the user corresponding to the radio frequency tag and the user recognized from the face image are the same, the control module 102 may send an execution signal to the execution module 103.

The timing for the image collecting module 101B to collect a face image may be after the control module 102 has identified the user corresponding to the radio frequency tag, with the collection triggered by the control module 102; or may be after the control module 102 receives the information sent by the radio frequency detecting module 101, with the collection triggered by the control module 102; or may be similar to the radio frequency detecting module 101 where the collection is performed in a detecting manner, which is not particularly limited in the present specification.

As another example, the identification of radio frequency tags may be combined with fingerprint recognition, and/or iris recognition, etc., which is not particularly limited in the present specification.

Figure 3:
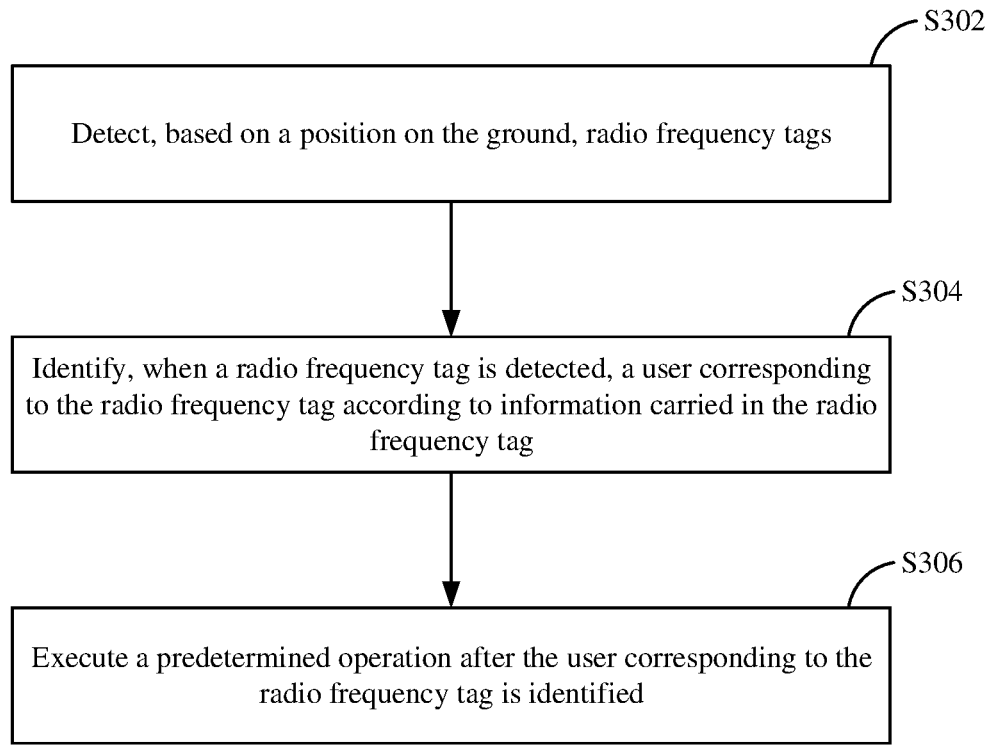
FIG. 3 is a flow chart of a method for realizing identity identification based on a radio frequency identification technology illustrated in an exemplary embodiment of the present specification.

Referring to FIG. 3, FIG. 3 is a schematic flow chart of a method for realizing identity identification based on a radio frequency identification technology illustrated in an exemplary embodiment of the present specification. The method for realizing identity identification based on a radio frequency identification technology may be applied in the identification system shown in FIG. 1, and may comprise the following steps: in step 302, detect, based on a position on the ground, radio frequency tags; in step 304, identify, when a radio frequency tag is detected, a user corresponding to the radio frequency tag according to information carried in the radio frequency tag; in step 306, execute a predetermined operation after the user corresponding to the radio frequency tag is identified.

The implementation process of the modules of the identification system 100 in the exemplary embodiment shown in FIG. 1 may be referenced for an exemplary implementation process of the above steps in embodiments of the method, which will not be elaborated in the present specification.

As an exemplary application, the identification system may be applied to a turnstile. Data transmission performed by the radio frequency detecting module and radio frequency tags with the NFC technology is used as an example for description.

Figure 4:
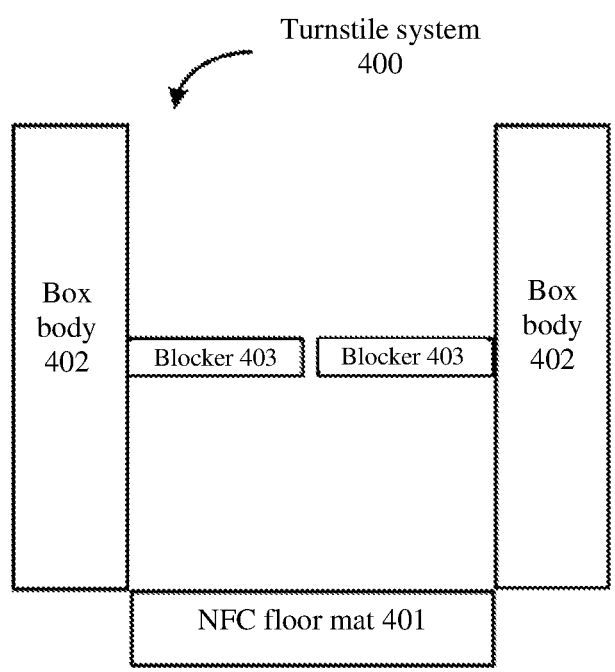
FIG. 4 is a top view of a turnstile system illustrated in an exemplary embodiment of the present specification.

Referring to the top view of a turnstile system shown in FIG. 4, the turnstile system 400 comprises: an NFC floor mat 401, a box body 402, and a blocker 403. Here, the NFC floor mat 401 may be placed at the entrance at the user side of the turnstile, and the NFC floor mat 401 may detect NFC tags at a predetermined interval, for example, 100 ms. Modules such as a control module (not shown), an execution module (not shown), and the like may be provided inside the box body 402. The box body 402 is used for protecting the internal parts including the control module, the execution module, and the like, and plays as a support. The blocker 403 is used for allowing or blocking the pass of a user.

For example, in the application of the turnstile system 400 at a bus station, a user (hereinafter Mr. White) has associated the NFC tag attached to the inside of his shoes with his user account in advance. When Mr. White takes a bus at the bus station, Mr. White steps on the NFC floor mat 401, the NFC floor mat 401 may detect the NFC tag in Mr. White's shoes, obtain the account information of Mr. White carried in the NFC tag, and then send the account information to the control module inside the box body 402. The control module may send the account information to a server, and the server may identify the user account of Mr. White according to the account information and then return a message of successful identification to the control module. Upon receiving the message of successful identification, the control module may send an execution signal to the execution module, and then the execution module may control the blocker 403 to open, to allow Mr. White to pass through.

In some embodiments, the control module may also send a payment request to the server, and the payment request carries the account information of Mr. White and the amount required for the current bus ride by Mr. White. Upon receiving the payment request, the server may deduct the above amount from the account of Mr. White based on the account information of Mr. White, thereby realizing the payment of the bus expense. In some embodiments, after successfully deducting the above amount, the server may also send a payment deduction message to Mr. White.

The timing for the control module to send the payment request may be when the message of successful identification is received, or may be after the execution module controls the blocker 403 to open, which is not particularly limited in the present specification.

In another example, an auxiliary module (not shown) may be further provided inside the box body 402. Upon receiving the message of successful identification, the control module may further send a control signal of successful identification to the auxiliary module, so that the auxiliary module outputs corresponding prompt information, such as a sound, a light, and the like, to notify Mr. White that the identification is successful and passage is allowed.

In some embodiments, if no corresponding user may be identified according to the account information, for example, the NFC tag does not carry account information or the carried account information is invalid, the identification may be determined as failed. The control module may send a control signal of failed identification to the auxiliary module, so that the auxiliary module outputs corresponding prompt information, such as a sound, a light, and the like, to prompt Mr. White that the identification is failed, passage is not allowed at this moment, and identification may be performed again.

In another turnstile application scenario, the turnstile system 400 shown in FIG. 4 may also be applied to subway entrances and exits. Unlike bus stations, segment pricing is typically used for a subway, i.e., the amount paid by a user for subway rides is related to the distance of the rides. In such application scenario, NFC floor mats may be provided for turnstile systems at subway entrances and exits.

When a user enters a station, the control module of the entrance turnstile may store a correspondence relationship between the account information of the user and the information of the entering station after identifying the user. When the user exits a station, the control module of the exit turnstile may search for the information of the entering station according to the account information of the user, then calculate the amount for the current subway ride by the user according to distance between the exiting station and the entering station, generate a payment request and send the payment request to the server.

In another turnstile application scenario, the turnstile system 400 shown in FIG. 4 may also be applied at ticket gates of train stations and tourist attractions.

For example, when at a ticket gate at a tourist attraction, the user Mr. White may bind his identity information with the NFC tag in his shoes in advance. For example, his ID number is bound with the NFC tag. After Mr. White successfully purchases a ticket to the tourist attraction, the tourist attraction's system may store the ID number of Mr. White into a predetermined database of purchased tickets. When Mr. White arrives at the tourist attraction and steps on the NFC floor mat of the ticket gate turnstile, the NFC floor mat may obtain the ID number of Mr. White carried in the NFC tag in the shoes of Mr. White, and then may send the ID number to the control module. The control module searches the database of purchased tickets according to the ID number. If the search finds a match, the control module may determine that Mr. White has purchased a ticket and send an execution signal to the execution module, and the execution module may then control the blocker 403 to open, to allow Mr. White to pass through.

From the above description, it may be seen that the identification system provided by the present specification may be applied in payment, ticket checking, and other various turnstile systems. The identification may be realized without requiring the user to present a card, a ticket, or other articles. The implementation is convenient, fast, and secure, and the user experience is improved.

In another exemplary application, the identification system may be applied to a POS system of a merchant. Data transmission performed by the radio frequency detecting module and radio frequency tags with the NFC technology is used as an example for description.

In some embodiments, an NFC floor mat may be placed on the ground in front of a checkout counter. When a user checks out at the checkout counter, both feet may be on the NFC floor mat. The NFC floor mat may obtain the account information of the user carried in the NFC tag in the shoes of the user, and then the control module may identify the user according to the account information. If a corresponding user is successfully identified, the control module may send an execution signal to the execution module, and then the execution module may output a cash register page to a cashier. The cashier may manually input an amount of consumption by the user, so that the control module initiates a payment request to a server.

In yet another exemplary application, the identification system may be applied to a supermarket with self-checkout. An NFC floor mat may also be placed on the ground in front of a checkout counter. When a user checks out at the checkout counter, both feet may be on the NFC floor mat. The NFC floor mat may obtain the account information of the user carried in the NFC tag in the shoes of the user, and then the control module may identify the user according to the account information. If a corresponding user is successfully identified, the control module may send an execution signal to the execution module, and then the execution module may turn on an infrared identification device, and the user may scan products selected by himself/herself for pricing. When the user completes the scanning, the control module may initiate a payment request to a server according to the total amount.

The implementations of the sending and paying the above payment requests may be referred to related technologies, which will not be elaborated in the present specification.

From the above description, it may be seen that the identification system provided by the present specification may be applied in POS systems at supermarkets, restaurants and other merchants. The payment function may be realized without requiring the user to call a payment code of a cell phone. The implementation is convenient, fast, and secure, and the user experience is improved.

The systems, devices, modules or units set forth in the foregoing embodiments may be achieved, for example, by computer chips or entities, or by products with certain functions. A typical implementation device is a computer. An exemplary form of the computer may be a personal computer, a laptop computer, a cell phone, a camera phone, a smart phone, a PDA (personal digital assistant), a media player, a navigation device, an email sending and receiving device, a game console, a tablet computer, a wearable device or a combination of any of these devices.

Particular embodiments of the present specification are described above, and other embodiments may fall within the scope of the appended claims. In some cases, actions or steps set forth in the claims may be executed in an order different from those in the embodiments and may still achieve desired results. In addition, processes depicted in the accompanying drawings may not necessarily require the illustrated particular order or a continuous order to achieve desired results. In some implementations, multi-task processing and parallel processing are also feasible or may be beneficial.

The above-described is only preferred embodiments of the present specification, which are not used to limit the present specification. Any modification, equivalent substitution, or improvement made within the spirit and principle of the present specification shall be encompassed by the claims of the present specification.

What is claimed is:

1. A system for realizing identity identification based on radio frequency identification, comprising:
   a controller of an entrance turnstile of a first station in a train or subway system;
   a first radio frequency detector attached to a first floor mat before the entrance turnstile and configured to detect a radio frequency tag attached to a shoe of a user and send, when the radio frequency tag is detected, information carried in the radio frequency tag to the controller of the entrance turnstile;
   a camera configured to collect a face image of the user at the entrance turnstile and send the collected face image to the controller of the entrance turnstile;
   wherein the controller of the entrance turnstile is configured to:
      determine, according to the information carried in the radio frequency tag that is detected by the first radio frequency detector, a first account number corresponding to the radio frequency tag,
      determine, according to the collected face image, a second account number, and
      control a blocker of the entrance turnstile to open to allow the user to pass through the entrance turnstile, and store a correspondence relationship between the first account number of the user and information of the first station in a database, when the first account number and the second account number match;
   a controller of an exit turnstile of a second station in the train or subway system; and
   a second radio frequency detector attached to a second floor mat before the exit turnstile and configured to detect the radio frequency tag attached to the shoe of the user and send, when the radio frequency tag is detected, the information carried in the radio frequency tag to the controller of the exit turnstile;
   wherein the controller of the exit turnstile is configured to:
      determine, according to information carried in the radio frequency tag that is detected by the second radio frequency detector, the first account number corresponding to the radio frequency tag,
      search the database for information of the first station according to the first account number of the user, and responsive to finding the information of the first station:
         control a blocker of the exit turnstile to open to allow the user to pass through the exit turnstile, after controlling the blocker of the exit turnstile to open, control the blocker of the exit turnstile to close to block the passage of other users through the exit turnstile, after controlling the blocker of the exit turnstile to close, calculate a payment amount according to a distance between the first station and the second station, generate a payment request comprising the payment amount and the first account number, and send the payment request to a payment server, wherein the payment server deducts the payment amount from an account of the user according to the first account number.

2. The system according to claim 1, wherein the controller of the exit turnstile is further configured to:
obtain a bill of the user.

3. A system for realizing identity identification based on radio frequency identification, comprising:

a first hardware processor of an entrance turnstile of a first station in a train or subway system;

a first radio frequency detector attached to a first floor mat before the entrance turnstile of the first station and configured to detect a radio frequency tag attached to a shoe of a user;

a camera configured to collect a face image of the user at the entrance turnstile and send the collected face image to the first hardware processor;

a first non-transitory machine-readable storage medium encoded with instructions that, when executed by the first hardware processor, perform operations to:

when the radio frequency tag is detected by the first radio frequency detector:

determine, according to information carried in the radio frequency tag that is detected by the first radio frequency detector, a first account number corresponding to the radio frequency tag, determine, according to the collected face image, a second account number, and control a blocker of the entrance turnstile to open to allow the user to pass through the entrance turnstile, and store a correspondence relationship between the first account number of the user and information of the first station in a database, when the first account number and the second account number match;

a second hardware processor of the exit turnstile of a second station;

a second radio frequency detector attached to a second floor mat before the exit turnstile of the second station in the train or subway system and configured to detect the radio frequency tag attached to the shoe of the user;

a second non-transitory machine-readable storage medium encoded with instructions that, when executed by the second hardware processor, perform operations to:

when the radio frequency tag is detected by the second radio frequency detector:

determine, according to information carried in the radio frequency tag that is detected by the second radio frequency detector, the first account number corresponding to the radio frequency tag, search the database for information of the first station according to the first account number of the user, and responsive to finding the information of the first station:

control a blocker of the exit turnstile to open to allow the user to pass through the exit turnstile, after controlling the blocker of the exit turnstile to open, control the blocker of the exit turnstile to close to block the passage of other users through the exit turnstile, after controlling the blocker of the exit turnstile to close, calculate a payment amount according to a distance between the first station and the second station, generate a payment request comprising the payment amount and the first account number, and send the payment request to a payment server, wherein the payment server deducts the payment amount from an account of the user according to the first account number.

4. The system according to claim 3, wherein the second hardware processor further performs operations to:
obtain a bill of the user.

5. A method for realizing identity identification based on a radio frequency identification technology, comprising:

detecting a radio frequency tag attached to a shoe of a user with a first radio frequency detector attached to a first floor mat before an entrance turnstile of a first station in a train or subway system;

determining, by a first controller of the entrance turnstile, when the radio frequency tag is detected by the first radio frequency detector, a first account number corresponding to the radio frequency tag according to information carried in the radio frequency tag;

obtaining a face image of the user at the entrance turnstile with a camera;

determining, by the first controller, a second account number based on the obtained face image of the user; and controlling, by the first controller of the entrance turnstile of the first station, a blocker of the entrance turnstile to open to allow the user to pass through the entrance turnstile, and store a correspondence relationship between the first account number of the user and information of the first station in a database, when the first account number and the second account number match;

detecting the radio frequency tag attached to the shoe of the user with a second radio frequency detector attached to a second floor mat before an exit turnstile of a second station in the train or subway system;

performing, by a second controller of the exit turnstile, responsive to the user exiting the second station through the exit turnstile, the following operations to:

determine, according to the information carried in the radio frequency tag that is detected by the second radio frequency detector, the first account number corresponding to the radio frequency tag, search the database for information of the first station according to the first account number of the user, and responsive to finding the information of the first station, control a blocker of the exit turnstile to open to allow the user to pass through the exit turnstile, after controlling the blocker of the exit turnstile to open, control the blocker of the exit turnstile to close to block the passage of other users through the exit turnstile, after controlling the blocker of the exit turnstile to close, calculate a payment amount according to a distance between the first station and the second station, generate a payment request comprising the payment amount and the first account number, and send the payment request to a payment server, wherein the payment server deducts the payment amount from an account of the user according to the first account number.

6. The method according to claim 5, wherein the second controller further performs the following operations:

obtaining a bill of the user.

* * * * *